US008948804B2

(12) United States Patent
Lee et al.

(10) Patent No.: US 8,948,804 B2
(45) Date of Patent: Feb. 3, 2015

(54) VIRTUAL SLIDE-TO-LOCK FEATURE FOR PUSH-TO-TALK COMMUNICATION APPLICATIONS

(75) Inventors: Justin V. Lee, Berkeley, CA (US); Thomas E. Katis, Jackson, WY (US)

(73) Assignee: Voxer IP LLC, San Francisco, CA (US)

( * ) Notice: Subject to any disclaimer, the term of this patent is extended or adjusted under 35 U.S.C. 154(b) by 444 days.

(21) Appl. No.: 13/464,139

(22) Filed: May 4, 2012

(65) Prior Publication Data

US 2013/0295982 A1 Nov. 7, 2013

(51) Int. Cl.
*H04W 4/10* (2009.01)
(52) U.S. Cl.
USPC .......................................... 455/518; 455/519
(58) Field of Classification Search
CPC ....... H04W 4/10; H04W 76/005; G06K 9/23; H04L 29/06442
USPC ........................................................ 455/518
See application file for complete search history.

(56) References Cited

U.S. PATENT DOCUMENTS

| 7,231,231 | B2* | 6/2007 | Kokko et al. ................... 455/566 |
| 7,262,761 | B1* | 8/2007 | Duarte et al. .................. 345/168 |
| 7,453,443 | B2* | 11/2008 | Rytivaara et al. ............. 345/173 |
| 8,180,029 | B2* | 5/2012 | Katis et al. .................. 379/93.01 |
| 8,321,582 | B2* | 11/2012 | Katis et al. ..................... 709/234 |
| 8,359,151 | B2* | 1/2013 | Carruthers et al. ............ 701/119 |
| 8,744,720 | B1* | 6/2014 | Fujisaki ........................... 701/96 |
| 8,812,041 | B2* | 8/2014 | Lee ................................ 455/518 |
| 2005/0079896 | A1* | 4/2005 | Kokko et al. ................... 455/566 |
| 2005/0253817 | A1* | 11/2005 | Rytivaara et al. ............. 345/173 |
| 2009/0003340 | A1* | 1/2009 | Katis et al. ..................... 370/389 |
| 2012/0162350 | A1* | 6/2012 | Lee et al. .................... 348/14.03 |
| 2013/0109425 | A1* | 5/2013 | Kerger et al. .................. 455/518 |
| 2013/0109426 | A1* | 5/2013 | Kerger et al. .................. 455/518 |
| 2014/0011533 | A1* | 1/2014 | Lee ................................ 455/518 |

* cited by examiner

*Primary Examiner* — Hai V Nguyen
(74) *Attorney, Agent, or Firm* — Beyer Law Group LLP

(57) ABSTRACT

A virtual Slide-to-Lock feature for communication devices running a PTT application. When the Slide-to-Lock feature is activated, a PTT locking function on the communication device is activated. As a result, messages on the communication device may be created, without the need of the user to continuously hold or select a Hold-to-Talk or similar PTT feature. In one non-exclusive embodiment, the virtual Slide-to-Lock feature is activated when a finger is moved from a first region to a second region on a touch-sensitive display screen and de-activated with the opposite motion.

20 Claims, 8 Drawing Sheets

VIRTUAL SLIDE-TO-LOCK FEATURE FOR PUSH-TO-TALK COMMUNICATION APPLICATIONS

BACKGROUND

1. Field of the Invention

The present invention relates to Push-To-Talk (PTT) communications, and more particularly, to a virtual Slide-to-Lock lock feature for communication devices running PTT applications.

2. Description of Related Art

In recent years, mobile communications and computing has become prevalent. More and more people are using mobile communication devices, such as smart phones and tablets, for a variety of reasons. In addition to conventional mobile telephony, individuals also use mobile communication devices for emailing, accessing the Internet, reading e-books, playing video games, and engaging in social networking, etc. Within social networking, PTT communication applications have become popular.

The Voxer® Walkie Talkie application, distributed by the assignee of the present application, is one well known PTT application, which runs on communication devices, such as smart phones, tablets and computers. With Voxer, a user is required to select a virtual "Hold-to-Talk" feature appearing on a screen of the communication device for the duration of a message. As the media of the message is created, the media is progressively stored and progressively streamed to the intended recipient(s), provided the Hold-to-Talk feature is selected. For further details on the Voxer application, see co-pending, commonly assigned, U.S. application Ser. No. 12/037,749, incorporated by reference herein for all purposes. Other known PTT applications also include a similar virtual PTT feature, which must be held for the duration of a message. These other PTT applications, however, are not progressive. Instead they rely on a store and forward protocol for first the recording of a message, and then the transmission of the message once it is complete.

Regardless of the type of PTT application, the need to continuously select a PTT feature (either Hold-to-Talk or a similar descriptor) is often problematic. For example, a user may inadvertently de-select the PTT feature in the middle of a message, causing an interruption or termination in the progressive storing and/or transmission of the media. As a result, the recipient(s) may receive an interrupted, partial, message. Also continuously holding the PTT feature is often inconvenient, particularly for a long period of time. The Voxer application, for example, is capable of supporting full-duplex communication, allowing two (or more) participants of a conversation to engage in near real-time communication, similar to a synchronous telephone call. Participants are therefore required to select the PTT feature for the entire duration of the full-duplex exchange, which may be inconvenient after a certain period of time.

The aforementioned Voxer® Walkie Talkie application includes an optional virtual "Talk" feature that may be used instead of the Hold-to-Talk feature. With the Talk feature, a user is required to initially select the virtual Talk feature to initiate the start of a message. When the message is complete, the Talk feature is de-selected, terminating the message. While convenient during near real-time, full-duplex, communication, the Talk feature has its own inconveniences. For example, the Talk feature is often inadvertently selected, causing the creation of "false" messages. If the user is unaware of the situation, a potentially long, data intensive, message that consumes bandwidth may be transmitted.

SUMMARY OF THE INVENTION

The present invention is directed to a virtual Slide-to-Lock feature for communication devices running a PTT application. When the Slide-to-Lock feature is activated, a PTT locking function on the communication device is activated. As a result, messages on the communication device may be created, without the need of the user to continuously hold or select a Hold-to-Talk or similar PTT feature. In one non-exclusive embodiment, the virtual Slide-to-Lock feature is activated when a finger is moved from a first region to a second region on a touch-sensitive display screen and de-activated with the opposite motion.

In alternative embodiments, the virtual Slide-to-Lock feature may be used with both progressive type PTT applications capable of full-duplex, live, communication and store and forward type PTT messaging applications. With progressive systems, transmission protocols and jitter buffers on the communication device may be selectively optimized for live communication when the PTT locking function is activated by the Slide-to-Lock feature. In addition, servers on the network and other participants in a conversation may also be notified so they too can be optimized for full-duplex, live, communication. Alternatively, the jitter buffers an servers on the network can be notified and optimized for asynchronous messaging communication when the PTT locking function is not activated.

BRIEF DESCRIPTION OF THE DRAWINGS

The invention may best be understood by reference to the following description taken in conjunction with the accompanying drawings, which illustrate specific embodiments of the invention.

It should be noted that like reference numbers refer to like elements in the figures.

The above-listed figures are illustrative and are provided as merely examples of embodiments for implementing the various principles and features of the present invention. It should be understood that the features and principles of the present invention may be implemented in a variety of other embodiments and the specific embodiments as illustrated in the Figures should in no way be construed as limiting the scope of the invention.

DETAILED DESCRIPTION OF SPECIFIC EMBODIMENTS

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obstruct the invention.

Figure 1:
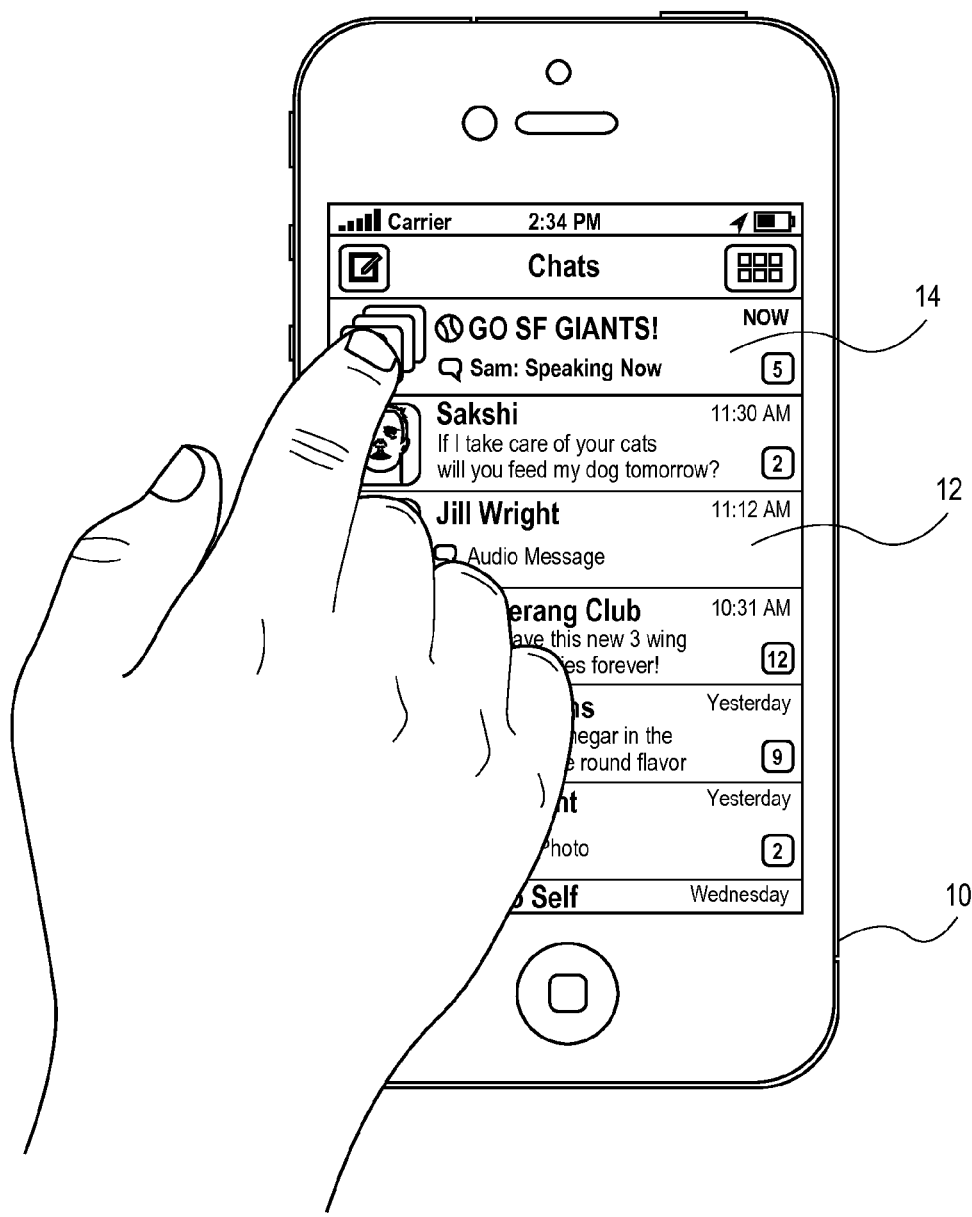
FIG. 1 is an exemplary, non-exclusive, embodiment of a mobile communication device running a PTT application in accordance with the principles of the present invention.

Referring to FIG. 1, a non-exclusive embodiment of a communication device 10 running a PTT application in accordance with the principles of the present invention is shown. In this particular embodiment, a list of active conversations or "chats" is displayed on the touch-screen 12 of the device 10. For the purpose of illustrating the virtual Slide-to-Lock feature of the present application, the figure shows a user of the device 10 selecting a conversation 14 entitled "GO SF GIANTS". The virtual Slide-to-Lock feature is described in detail below within the context of this conversation.

Figure 2A:
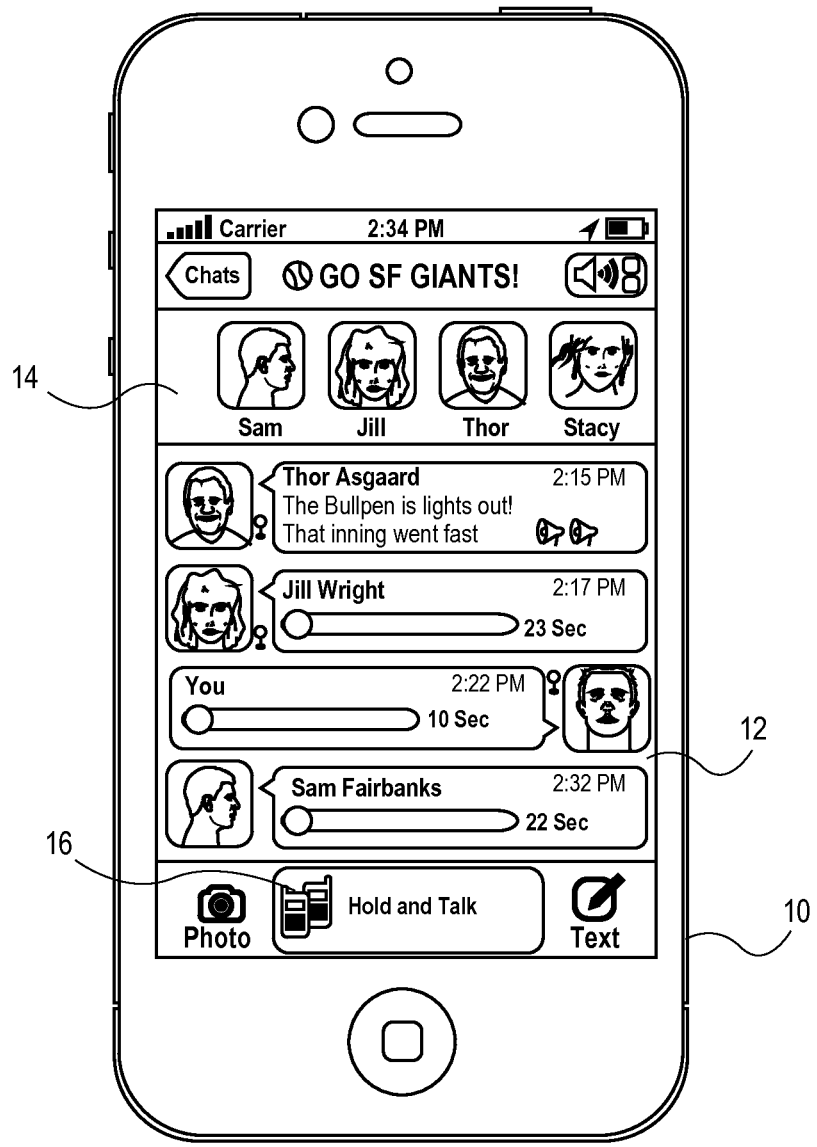
FIGS. 2A-2D are exemplary diagrams of the activation of a virtual Slide-to-Lock feature for use in cooperation with a PTT application in accordance with the principles of the present invention.

Referring to FIGS. 2A-2D, a series of diagrams showing the activation and de-activation of a virtual "Slide-to-Lock" feature according to one non-exclusive embodiment is illustrated. In FIG. 2A, the conversation history of the GO SF GIANTS conversation is displayed after the selection is made. In addition to the conversation history, a virtual PTT region 16, labeled "Hold and Talk", is provided on the screen 12.

Figure 2B:
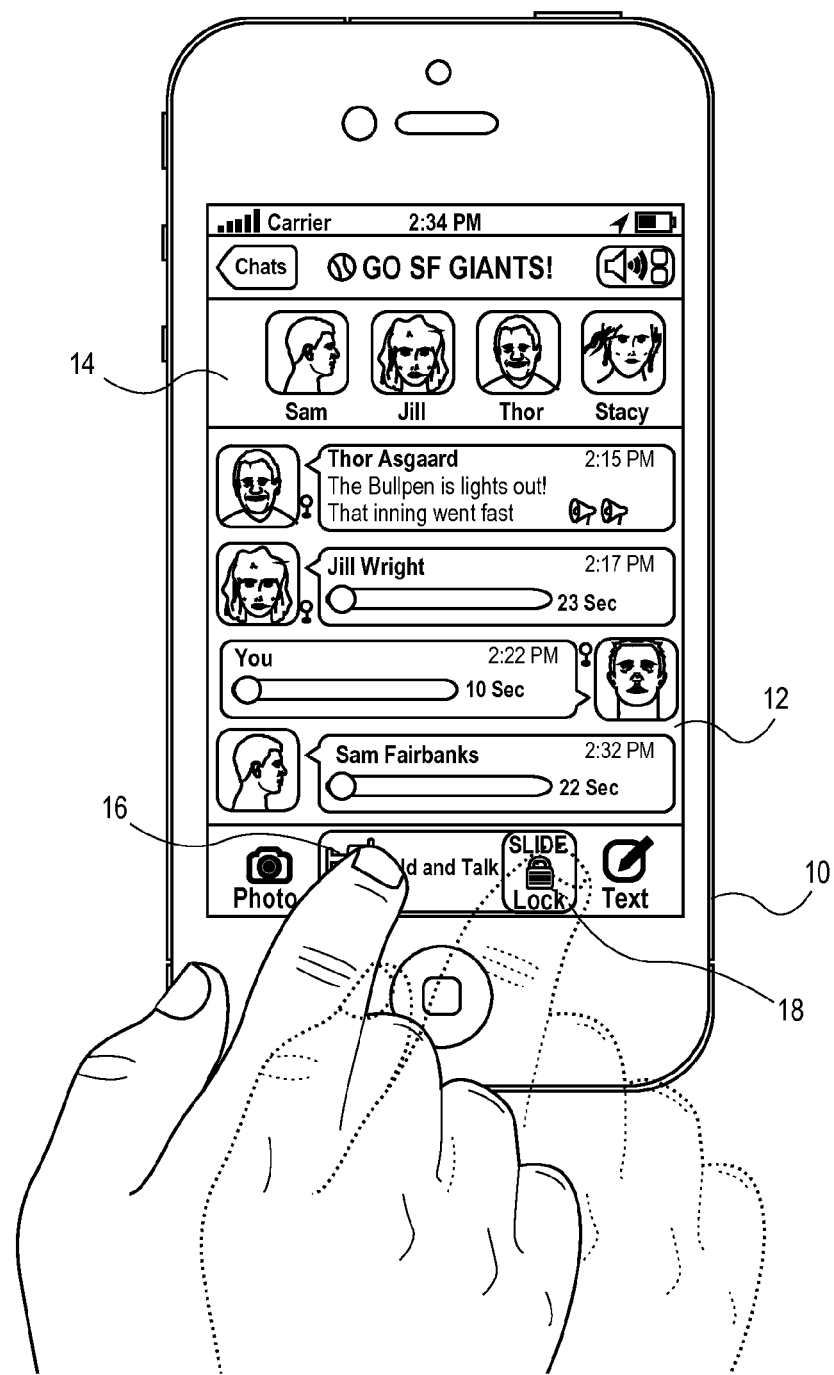

In a non-exclusive embodiment, as illustrated in FIG. 2B, a "Slide-to-Lock" feature 18 appears when the Hold to Talk region 16 is contacted. Alternatively, the Slide-to-Lock feature 18 may always appear in the region 16.

Figure 2C:
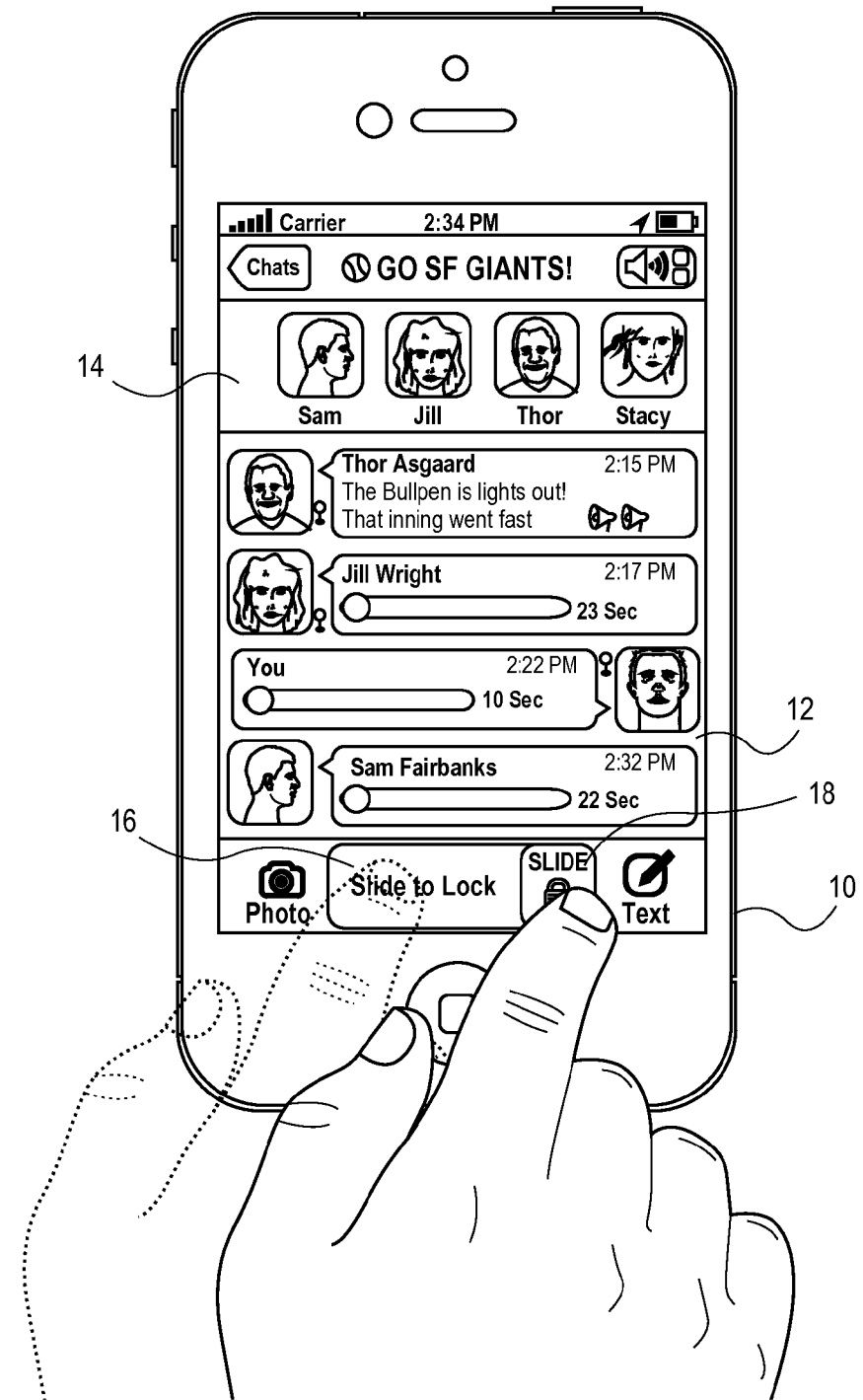

Regardless of the embodiment, the virtual "Slide-to-Lock" feature 18 is activated by the user sliding a finger from left to right over the region 16, until the Slide-to-Lock feature 18 is contacted. When this sliding motion is detected on the touch-sensitive display screen 12, it signifies the selection of the Slide-to-Lock feature 18. As a result, the text displayed in the region 16 changes from "Hold to Talk" to "Slide-to-Lock", as illustrated in FIG. 2C.

When the Slide-to-Lock feature 18 is activated, it results in the activation of a PTT locking function on device 10. When the PTT locking function is activated, the user of device 10 no longer needs to select or hold the region 16 and/or 18 while creating a message. Rather, the user can simply speak into the microphone, or generate other types of media, without having to hold or contact the region 16 and/or 18.

Figure 2D:
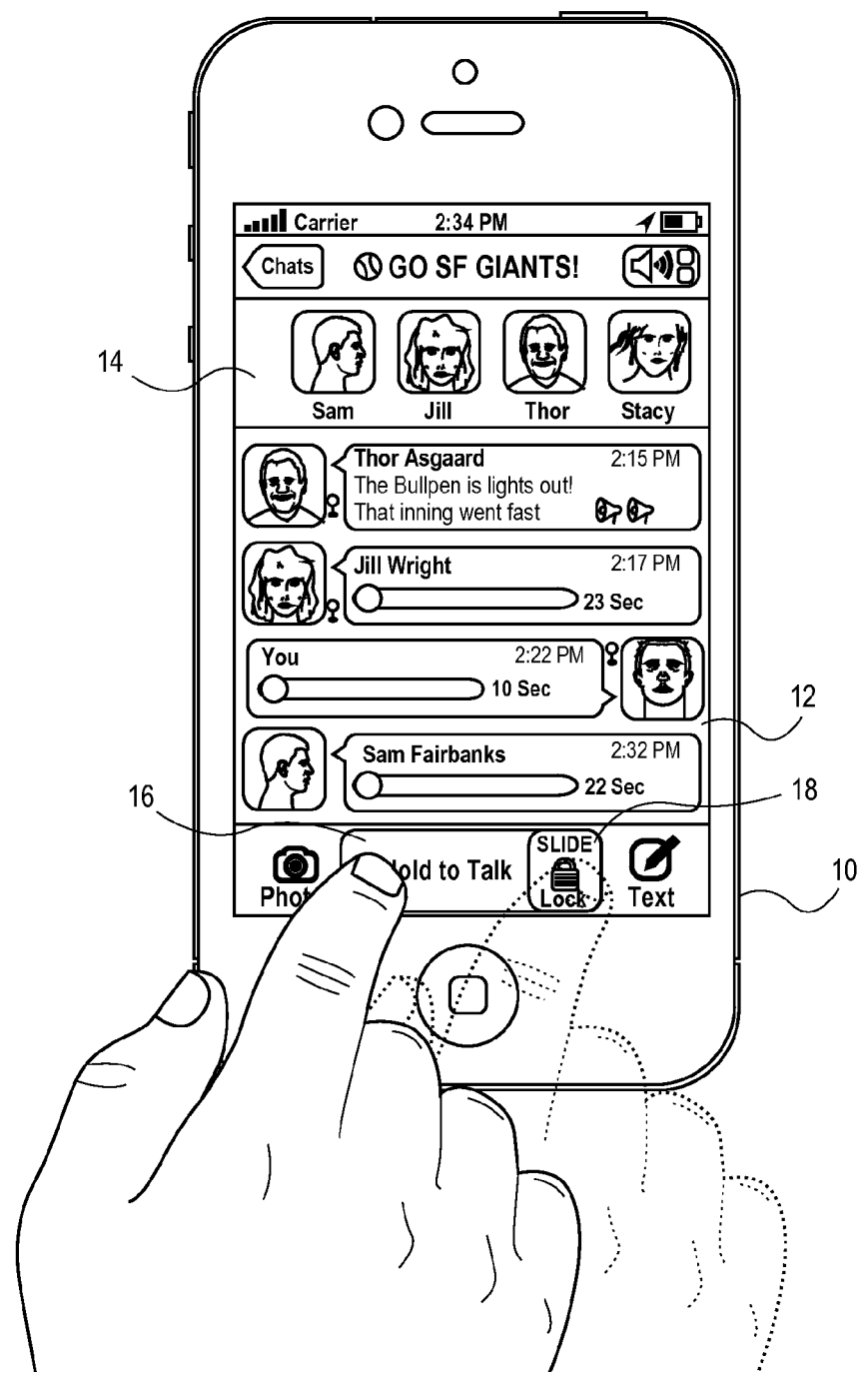

The PTT locking function may be de-activated in one of several ways. The Slide-to-Lock feature 18 can be used for de-activation by sliding a finger from region 18 to region 16, as illustrated in FIG. 2D. Alternatively, the PTT locking function can be automatically de-activated by returning to the active conversations list as illustrated in FIG. 1, or closing out of the PTT application altogether. In the latter two methods, a deliberate action to de-active the virtual Slide-to-Lock feature, as described above, is not required The requirement of sliding a finger across both regions 16 and 18 helps reduce the incidence of false positives when either activating or de-activating the PTT locking function using the virtual Slide-to-Lock feature. Alternatively, however, the user can simply contact to the region 16 for the duration of a message if using the virtual Slide-to-Lock feature 18 is not desirable. In the latter case, the user can simply maintain finger contact with the "Hold to Talk" region 16, or a similar PTT feature, for the duration of the message.

In various embodiments, the activation of the PTT locking function with the Slide-to-Lock feature 18, as described above, may be used with different types of PTT applications. For example, the Slide-to-Lock feature 18 may be used with both (i) progressive type PTT applications where a message is transmitted as the media is created and progressively stored and (ii) store and forward type PTT applications where the message is transmitted out of storage after the message is complete.

Figure 3:
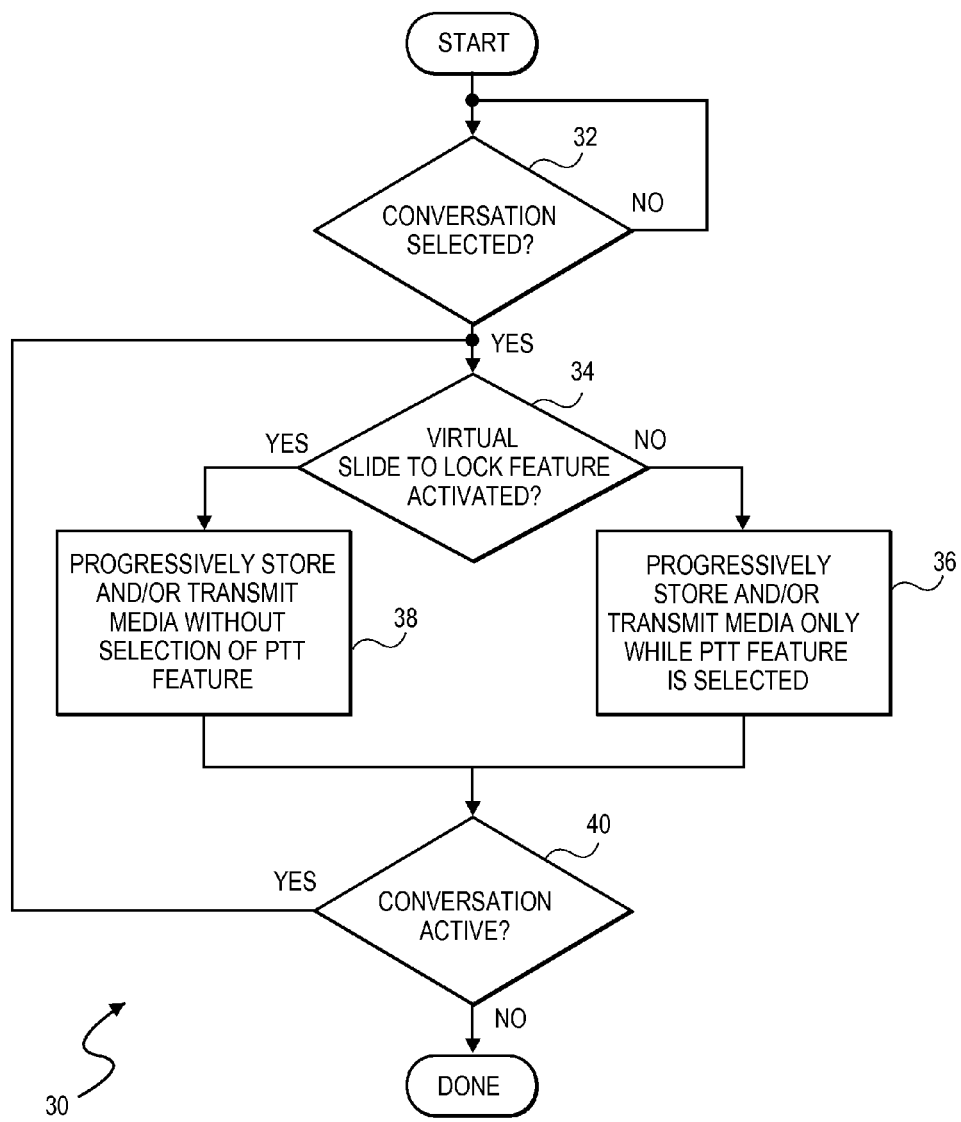
FIG. 3 is flow diagram illustrating the steps of a non-exclusive embodiment for implementing the virtual Slide-to-Lock feature in accordance with the principles of the present invention.

Referring to FIG. 3, a flow diagram 30 illustrating operation of the virtual Slide-to-Lock feature on the device 10 is illustrated. In the initial decision step 32, it is determined if a conversation has been selected. If yes, then it is determined if the virtual Slide-to-Lock 18 feature has been implemented in decision 34. If not, then media of an outgoing message is progressively stored and/or transmitted (Step 36) only when the Hold-to-Talk region 16 or similar PTT feature is contacted. If yes, the PTT locking function is activated and media of an outgoing message is progressively stored and/or transmitted (step 38), without the requirement of maintaining contact with the Hold-to-Talk region 16 or a similar PTT feature. As determined in decision 40, the above-described process is continually repeated, so long as the user actively participates in the conversation.

Figure 4:
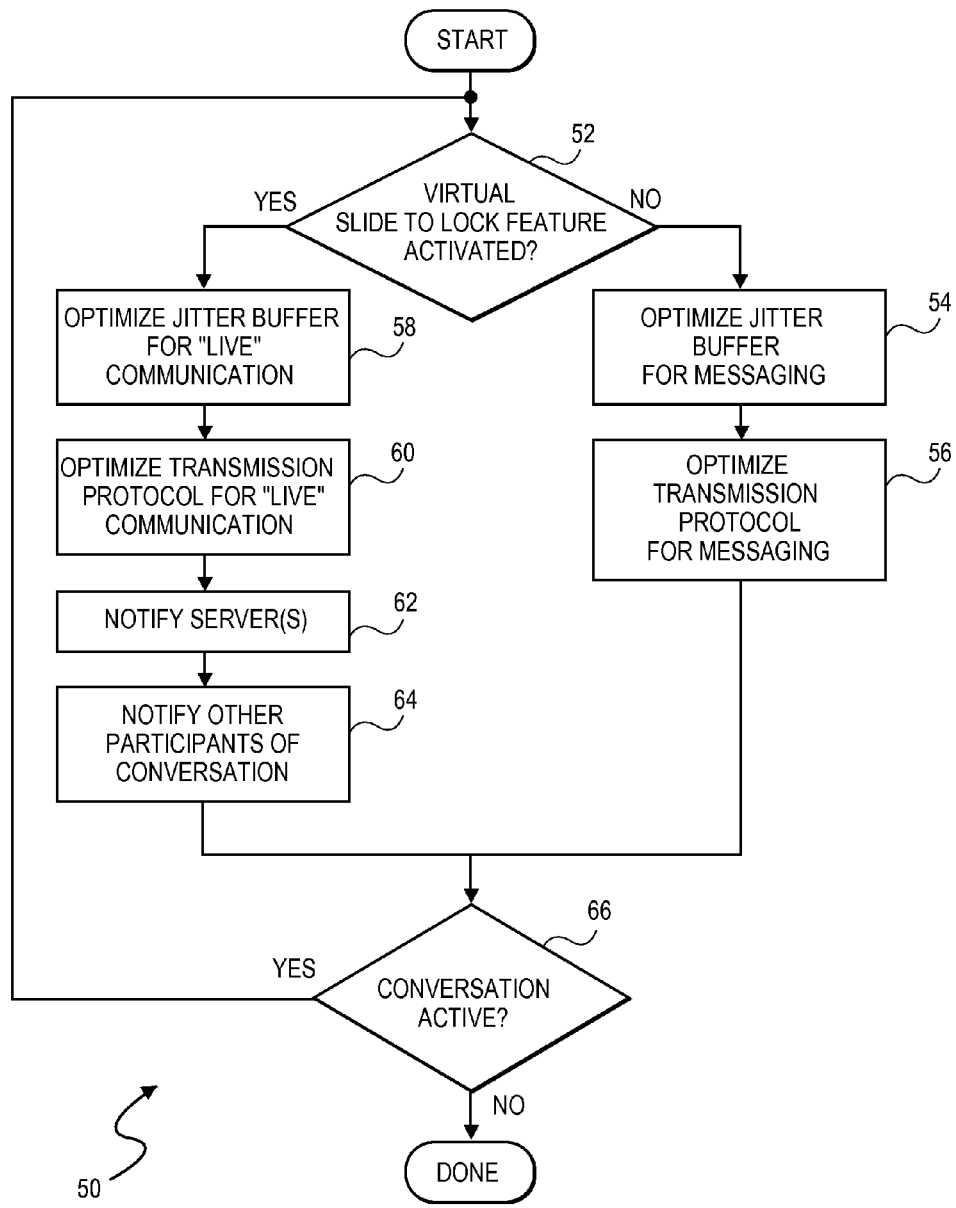
FIG. 4 is flow diagram illustrating the steps of another non-exclusive embodiment for implementing the virtual Slide-to-Lock feature in accordance with the principles of the present invention.

Referring to FIG. 4, a flow diagram 50 illustrating an optional embodiment of the present invention useful for progressive type PTT applications is illustrated. In this embodiment, it is determined if the virtual Slide-to-Lock feature 18 is activated or not (decision 52). If the virtual Slide-to-Lock feature is not activated, then the jitter buffer used for de-jittering incoming media (step 54) and the transmission protocol (step 56) used for transmitting outgoing media on the communication device 10 are optimized for non-live or time-shifted messaging. Alternatively, if the Slide-to-Lock feature 18 is implemented, then it is assumed that a full-duplex, live, conversation is taking place. As a result, a number of steps are taken on the communication device 10 to operate in a real-time or "live" call mode. For example, the jitter buffer may be optimized or tuned (step 58) for rendering incoming media as it is received over the network in real-time. In addition, the transmission protocol (step 60) for outgoing media may also be optimized for delivering media to intended recipients so that the media can be reviewed in near real-time or live. Further, steps can be taken on the network to enhance near real-time or live communication, such as notifying servers (step 62) on the network and other participants (step 64) of the conversation status so that they too can optimize operation and transmission protocols for real-time or live communication. As determined in decision 66, the above-described process is continually repeated, so long as the user actively participates in the conversation.

Figure 5:
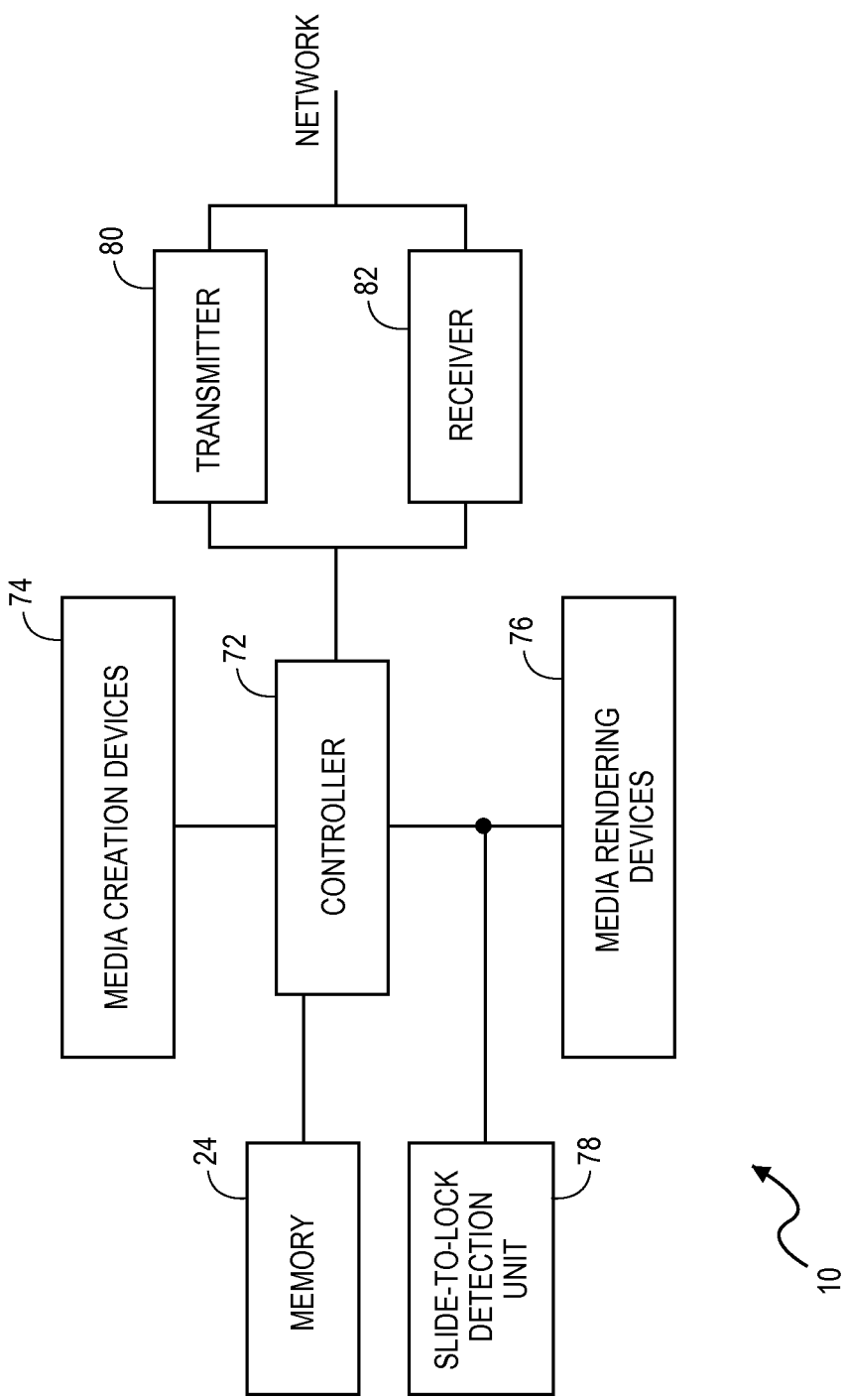
FIG. 5 is a block diagram of a communication device running an application including the Slide-to-Lock feature in accordance with the principle of the present invention.

Referring to FIG. 5, a block diagram of a communication device 10 running a PTT application including the Slide-to-Lock feature 18 is illustrated. In a non-exclusive embodiment, the Slide-to-Lock feature 18 is embedded in a PTT application, such as but not limited to Voxer. In this non-exclusive embodiment, the device 10 includes a controller 72, one or more media creation devices 74, such as a microphone, still and/or video camera, sensors, GPS unit, and keyboard, one or more media rendering devices 76, such as a speaker or touch-sensitive display screen 12, a Slide-to-Lock detection unit 78, a transmitter 80 and a receiver 82, both of which couple the device 10 to a network, and a memory 84 for storing the PTT application, as well as other data, such as media.

During execution of the PTT application, the Slide-to-Lock detection unit 78 monitors and detects the sliding motion as described above on the display screen 12 when the Slide-to-Lock feature 18 is either activated or de-activated. When either occurs, the controller 72 is notified and the PTT locking function is either activated or de-activated respectively. When activated, media created by the one or more of the media creating devices 74 is then progressively stored and/or transmitted, without the need to hold/select the Hold to Talk region 16 or similar PTT feature. When de-activated, then created media is progressively stored only when the Hold to Talk region 16 or similar PTT feature is selected. In various alternative embodiments, the created media may be (i) progressively stored in memory 24 and progressively transmitted by transmitter 80 when the media is created, or initially stored in memory 24 and transmitted out of storage after the message is complete. In various embodiments, the Slide-to-Lock detection unit 78 and controller 72 operate in cooperation with the touch-sensitive display screen 12 in a well known manner and may be implemented in hardware, software, firmware, or any combination thereof.

It should be also noted that the media transmitted, while the PTT locking function is activated by the Slide-to-Lock feature 18, can be any type of media. Such media may include, but is not limited to, voice, video, text, photos, sensor data, GPS or positional data, or any other type of streaming or non-streaming media.

Although the device 10 as illustrated resembles an iPhone from Apple, Cupertino, Calif., in no way should this be construed as limiting the present invention. On the contrary, the virtual PTT locking function of the present invention may be implemented on any PTT device 10, including a mobile phone, a mobile radio, a tablet computer, a laptop computer, or a desktop computer.

Lastly, the specific descriptive language "Slide-to-Lock" as used and illustrated herein for describing the function and operation of region 18 should not be construed as limiting. Rather, any descriptive language may be used for describing any feature that operates in a similar manner and that involves a sliding action for implementing a PTT locking function on a communication device 10.

While the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and methods and should not be restricted to the ones mentioned above. It is therefore intended that the invention be interpreted to include all variations and equivalents that fall within the true spirit and scope of the invention.

What is claimed is:

1. Computer code embedded in a non-transitory computer readable medium and intended to run on a communication device configured to communicate over a network, the computer code configured to:
   provide on a display screen associated with the communication device a virtual Slide-to-Lock feature for selectively activating a PTT locking function on the communication device;
   progressively store on the communication device media created using the communication device when the PTT locking function is activated; and
   displaying a conversation history, including the media created using the communication device when the PTT locking function is activated, on a display screen of the communication device.

2. The code of claim 1, wherein the PTT locking function is activated by a first sliding action in the vicinity of the virtual Slide-to-Lock feature on the display screen.

3. The code of claim 2, wherein the PTT locking function is de-activated by a second sliding action in the vicinity of the virtual Slide-to-Lock feature on the display screen.

4. The code of claim 1, wherein the code is further configured to progressively transmit media created using the communication device over the network as the media is created while the PTT locking function is activated by the virtual Slide-to-Lock feature.

5. The code of claim 4, wherein the code is further configured to stop the progressive transmission of media when the PTT locking function is de-activated.

6. The code of claim 1, wherein the code is further configured to transmit the media out of storage after the PTT locking function is de-activated.

7. The code of claim 1, wherein the code is further configured to use a transmission protocol that supports near real-time communication when the PTT locking function is activated.

8. The code of claim 1, wherein the code is further configured to perform jitter buffer optimization supporting near real-time rendering of incoming media received at the communication device when the PTT locking function is activated.

9. The code of claim 1, wherein the code is further configured to notify an intended recipient of media created on the communication device when the PTT locking function is activated.

10. The code of claim 1, wherein the code is further configured to notify one or more servers on the network when the PTT locking function is activated.

11. The code of claim 1, wherein the code is further configured to use a transmission protocol supporting asynchronous messaging when the PTT locking function is de-activated.

12. The code of claim 1, wherein the code is further configured to perform jitter buffer optimization for rendering incoming media in a time-shifted, messaging, mode when the PTT locking function is de-activated.

13. The code of claim 1, wherein the code is further configured to notify an intended recipient of media created on the communication device when the PTT locking function is de-activated.

14. The code of claim 1, wherein the code is further configured to notify one or more servers on a network when the PTT locking function is de-activated.

15. The code of claim 1, wherein the communication device configured to run the code comprises one of the following:
   (i) a mobile phone;
   (ii) a mobile radio;
   (iii) a tablet computer;
   (iv) a laptop computer; or
   (v) a desktop computer.

16. The code of claim 1, further comprising a message module configured to generate a message containing media when the PTT locking function is activated using the Slide-to-Lock feature, the message containing one of the following:
   (i) voice media;
   (ii) video media;
   (iii) text media;
   (iv) photo media;
   (v) sensor media;
   (vi) GPS or positional media;
   (vii) streaming media;
   (viii) non-streaming media; or
   (ix) any combination of (i) through (viii).

17. The code of claim 16, wherein the messaging module terminates the message when the PTT locking function is de-activated.

18. The code of claim 1, wherein the code is further configured to operate in a full-duplex live call mode when the PTT locking function is activated using the Slide-to-Lock feature.

19. The code of claim 1, wherein the code is further configured to operate in a asynchronous messaging mode when the PTT locking function is not activated.

20. The code of claim 1, wherein conversation history displayed on the display screen of the communication device by the code includes:
   (i) voice messages; and/or
   (ii) text messages.

* * * * *